United States Patent [19]

Denkowski et al.

[11] Patent Number: 4,474,078
[45] Date of Patent: Oct. 2, 1984

[54] VALVE OPERATOR DE-CLUTCH MECHANISM

[75] Inventors: Walter J. Denkowski, Rustburg; Raymond D. Regan, Lynchburg, both of Va.

[73] Assignee: Philadelphia Gear Corporation, King of Prussia, Pa.

[21] Appl. No.: 390,239

[22] Filed: Jun. 21, 1982

[51] Int. Cl.³ .................................................. F16H 35/00
[52] U.S. Cl. ........................................ 74/625; 192/35; 192/48.1; 192/67 R
[58] Field of Search ............... 74/625; 192/83, 53 G, 192/67 R, 67 A, 67 P, 48.1, 35, 55

[56] References Cited

U.S. PATENT DOCUMENTS

| | | | |
|---|---|---|---|
| 2,694,320 | 11/1954 | Kron | 74/625 |
| 2,698,546 | 1/1955 | Bolsey et al. | 74/625 |
| 2,703,991 | 3/1955 | Kron et al. | 74/625 |
| 2,775,907 | 1/1957 | Morrell | 74/625 |
| 2,989,878 | 6/1961 | Denkowski et al. | 74/625 |
| 3,170,339 | 2/1965 | Plume | 74/626 |
| 3,216,278 | 11/1965 | Plume | 74/625 |
| 3,726,155 | 4/1973 | Denkowski et al. | 74/625 |
| 3,838,609 | 10/1974 | Denkowski et al. | 74/625 |
| 4,022,309 | 5/1977 | Denkowski et al. | 74/625 X |
| 4,280,373 | 7/1981 | Denkowski et al. | 74/625 |
| 4,346,728 | 8/1982 | Sulzer | 251/249.5 |
| 4,370,902 | 2/1983 | Fry et al. | 74/625 |
| 4,393,965 | 7/1983 | Zouzoutas | 192/48.91 |
| 4,429,591 | 2/1984 | Zucii et al. | 74/625 |

Primary Examiner—Leslie A. Braun
Assistant Examiner—Dwight G. Diehl
Attorney, Agent, or Firm—Paul & Paul

[57] ABSTRACT

A valve operator has a de-clutch mechanism for automatically shifting the clutch out of handwheel drive and into electric motor drive upon actuation of the electric motor. The motor drive sleeve 23 has an annular step 25 which has a flat 26. The clutch 50 is biased by spring 55 toward the motor drive sleeve 23 but is prevented from moving in the direction of the motor drive sleeve by the clutch fork 40 which has extending therefrom two latch arms 71,72 one of which 71 is longer than the other 72. The longer latch arm 71 abuts against the step 25 on the motor drive sleeve. When the electric motor M is energized, the motor drive sleeve rotates and the flat 26 comes into alignment first with the longer latch arm 71 and later with the shorter latch arm 72, thereby releasing in two steps the clutch fork 40 and allowing the clutch 50 to shift out of handwheel drive and into electric motor drive.

7 Claims, 11 Drawing Figures

VALVE OPERATOR DE-CLUTCH MECHANISM

BACKGROUND OF THE INVENTION

This invention relates to power drive valve actuators, frequently referred to as valve operators.

The invention relates particularly to a valve actuator with an improved de-clutch mechanism for latching the clutch in handwheel drive, and releasing the clutch and shifting it to motor drive in response to actuation of the motor.

The new de-clutch mechanism may be used for full-turn valve operators, but it is particularly useful in part-turn valve operators of the type used for servicing industrial and control valves, such as butterfly, ball and plug-type valves, dampers and other part-turn equipment.

SUMMARY OF THE INVENTION

The object of the present invention is to provide an improved de-clutch mechanism for latching the clutch in handwheel drive and controlling the shifting of the clutch out of handwheel drive and into electric motor drive upon actuation of the motor drive.

A further object is for the de-clutch mechanism of the above type to stay locked in the manual mode. This objective is aided by the use of a self-locking input worm set.

The foregoing objects are achieved by providing a motor drive sleeve with an annular step which has a flat. The clutch fork is provided with two L-shaped latch arms which are pinned to and extend from the fork toward the motor drive sleeve. The latch arms are adjacent and parallel to each other, but one latch arm is made slightly longer than the other. The sum of the widths of the two latch arms is made greater than the width of the flat so that if the motor drive should accidentally stop in such position that the flat is in alignment with both latch arms, both latch arms cannot pass through the flat although urged by a heavily biased fork to do so. So long as the end of either of the two latch arms bears against the motor drive sleeve step, the fork cannot shift the clutch out of handwheel drive into motor drive. Both latch arms must be released before the clutch can be shifted.

Release of the latched clutch takes place in two steps. When the motor drive is rotated to a position such that the flat on the sleeve step is in alignment with the longer one of the latch arms, the longer latch arm moves into the flat. It is prevented, however, from moving more than a short distance by the shorter latch arm whose end has moved into abutment against the sleeve step. Upon further rotation of the motor drive, the shorter latch arm comes into alignment with the flat and is able to move forward. By the time this has happened, the longer latch arm has been cammed by the flat on to the upper edge of the step and is also able to move forward. The clutch fork is now fully released, and, in response to the heavy biasing spring, shifts the clutch out of handwheel drive and into electric motor drive. The motor drive includes a self-locking worm and worm gear which prevents rotation of the motor drive sleeve when the mechanism is in handwheel drive. Otherwise the frictional engagement between the worm gear shaft and the motor drive sleeve might rotate the sleeve when the mechanism is in handwheel drive. This would bring the flat into alignment with the latch arms and would release the clutch fork. This is undesirable when in the manual mode and is prevented by the self-locking worm drive.

DETAILED DESCRIPTION OF THE PREFERRED EMBODIMENT

The improved de-clutch mechanism may be used on full turn valve operators but the mechanism is designed primarily to operate part-turn valves such as butterfly, ball, and plug valves. A brief description will first be given. An output torque is produced at the output drive sleeve 32 (FIGS. 1 and 3) to rotate the stem S and stem nut 35 for 90 degrees. The torque is transmitted by an electric motor M through a spur gear 13 and two sets of worm gears 17 and 33. A standard 1800 rpm motor is used. Four different operating times are produced, namely, 15,30,60 and 90 seconds. The different output times are accomplished by changing the worm gear ratios. All worm gears are of the self-locking design which is necessary, as will become clear, for the type of valve service here involved.

Figure 1:
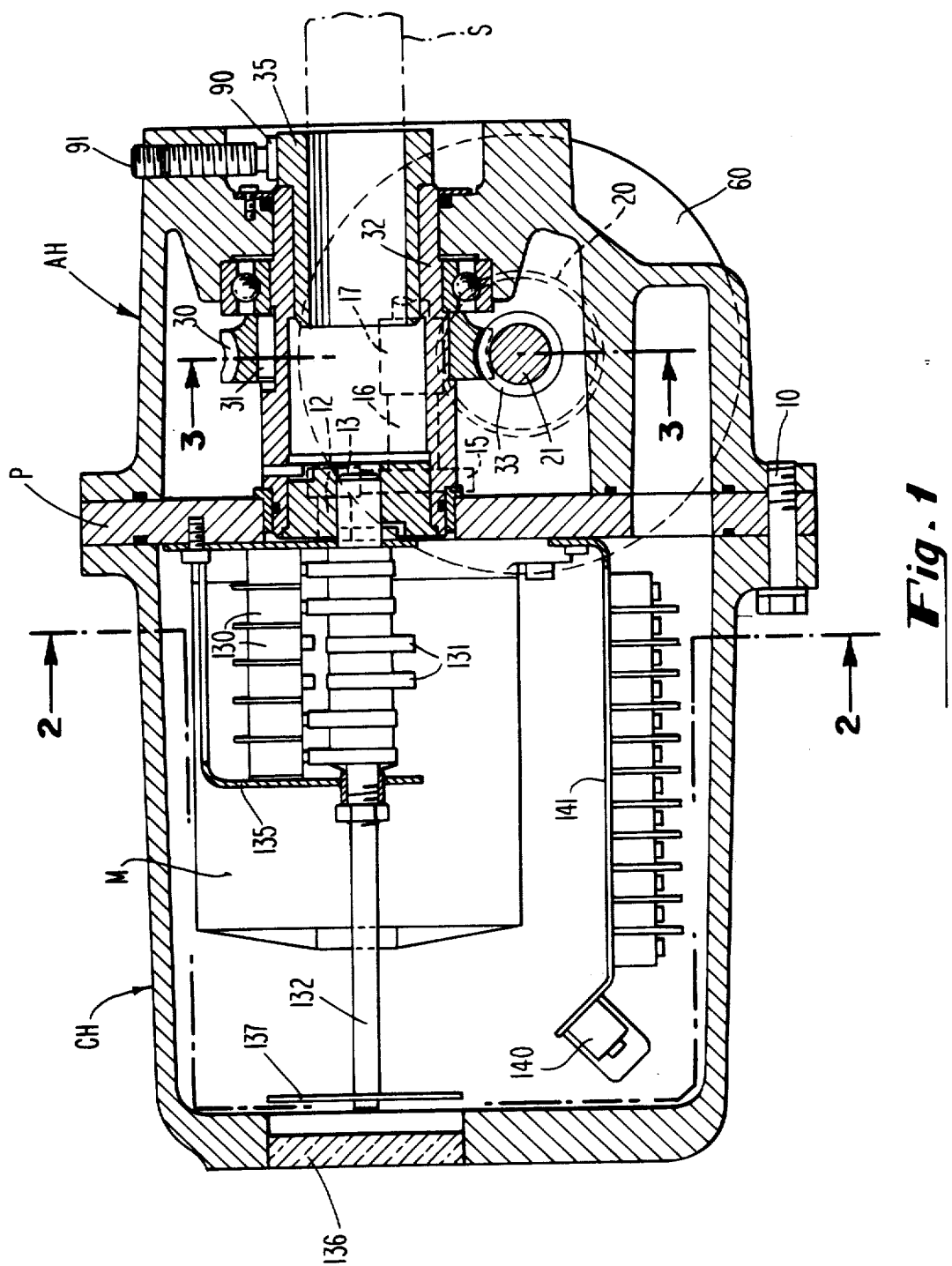
FIG. 1 is a view, in section, of a part-turn valve operator embodying the present invention.
Figure 2:
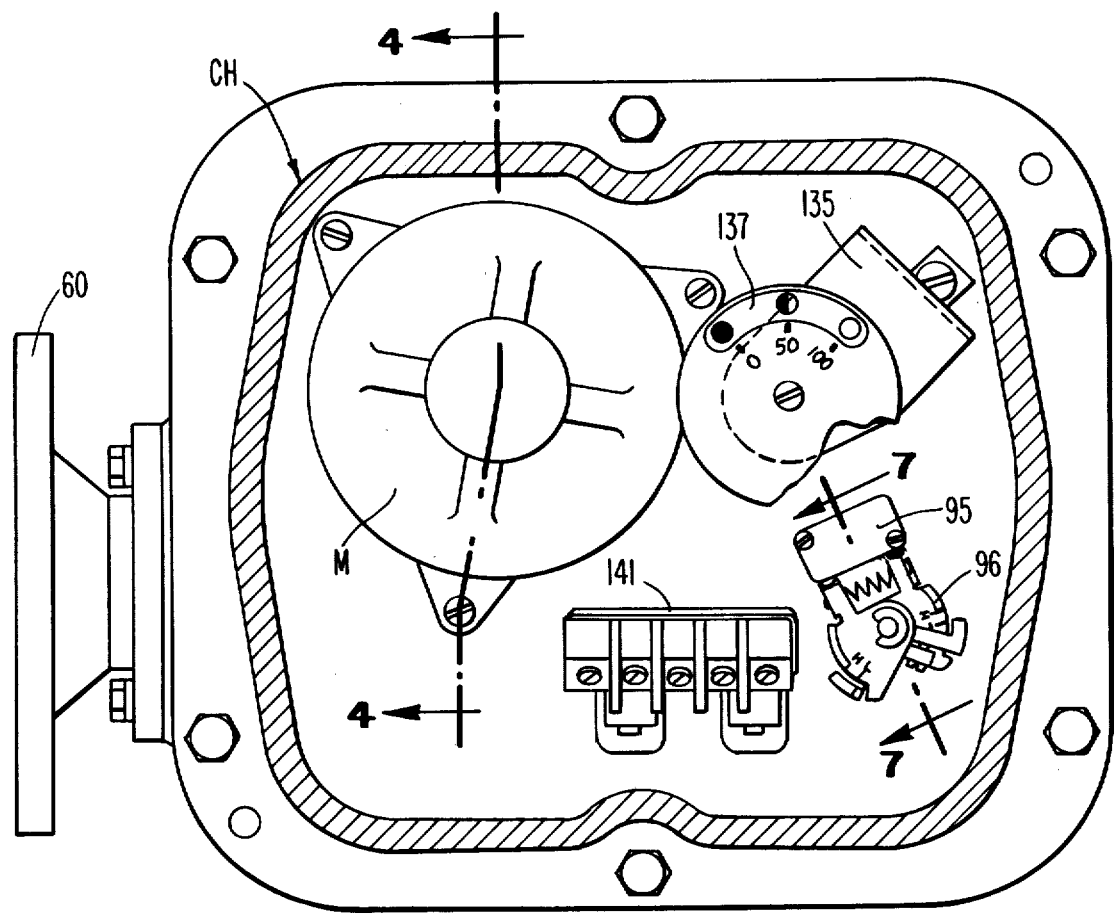
FIG. 2 is a view looking along the line 2—2 of FIG. 1.

When used in a part-turn valve operator, the valve operator includes mechanical stops and screws 91,90 and cam-operated position limit switches 130 (FIG. 1). The position limit switches 130 are the primary positioning means. The stops 90 and stop screws 91 protect the valve in the event that the position limit switch does not function. The mechanical stop lugs 90 are molded as part of the stem nut 35. The lugs contact stop screws 91 in the housing and limit the rotation of the drive sleeve 32 at the end of the 90 degree open or close cycle. The position limit switches 130 are of the microtype snap-action design. The switches 130 are mounted on the switch bracket 135 located on the cam shaft 132 which is fixed to the output drive sleeve 32. The local valve position is indicated by the dial 137 which is attached to the cam shaft 132. The dial is seen through the dial window 136.

Figure 3:
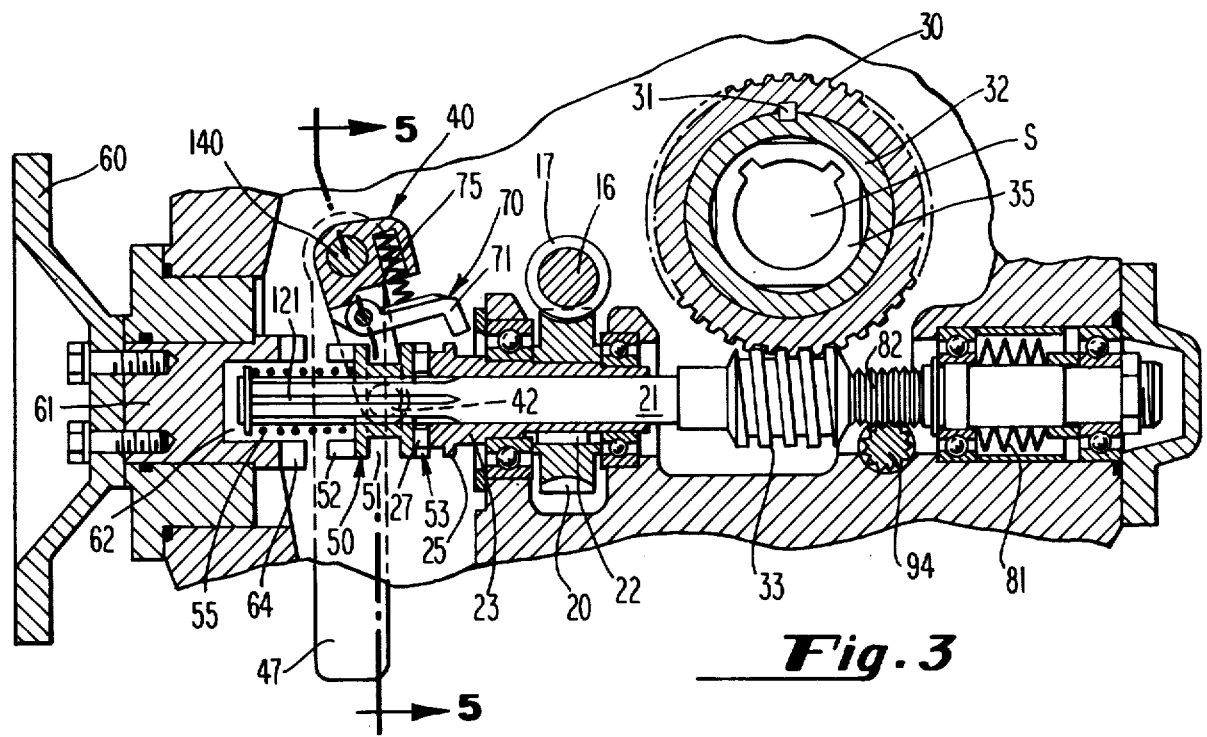
FIG. 3 is a view, in section, looking along the line 3—3 of FIG. 1 showing the handwheel and motor drives and the de-clutch latch mechanism.
Figure 7:
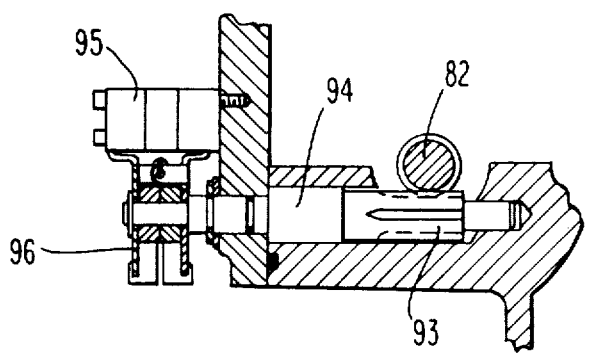
FIG. 7 is a view, in section, showing the overload torque switch.

Output torque overload protection is provided by the torque switch 95 (FIG. 7). The torque switch shaft 94 is rotated by a rack 82 which is on the output worm shaft 21 (FIG. 3). The rack 82 meshes with the splines 93 of the torque switch shaft 94. Affixed to the torque switch shaft 94 are setting arms 96 which, when the torque switch shaft is rotated, contact the actuator dials which break the circuit of the microswitches 95. Movement of the rack 82 occurs when resistance on the output worm 33 is sufficiently great to deflect the sensitive springs 81. These springs 81 are preferably disc springs.

The motor M may be designed for different voltages such as 110, 220 and 460 volts. For 110 volts, a 100-volt single-phase motor is used which is of the capacitor start design.

Figure 4:
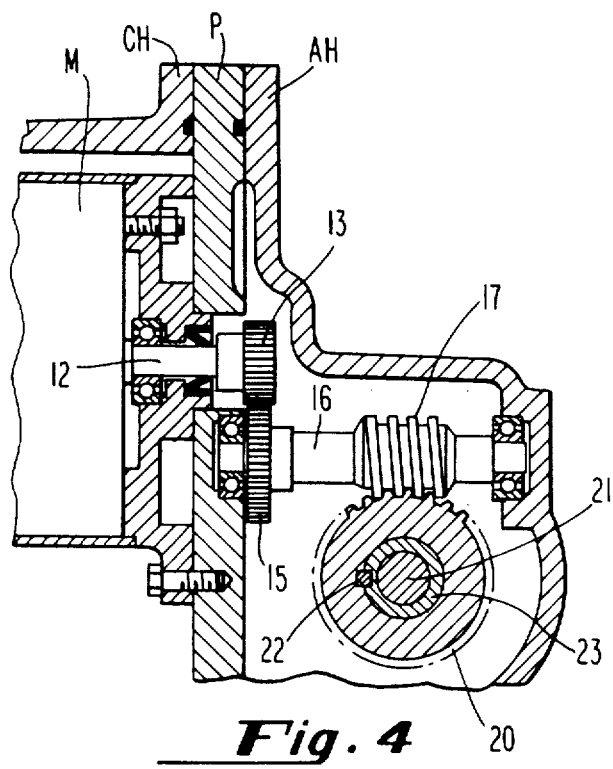
FIG. 4 is a view, in section, looking along the line 4—4 of FIG. 2 showing the motor drive.

In mechanical power operation, that is, in motor drive, as seen best in FIG. 4, the motor M drives the motor pinion 13 which is fixed to the motor shaft 12. The pinion 13 drives the gear 15 which is fixed to the input worm shaft 16. Worm 17 on the input worm shaft 16 drives the input worm gear 20 which is keyed to the worm gear sleeve 23. As seen in FIG. 3, the sleeve 23 drives the output worm shaft 21 through the sleeve lugs 27 and the lugs 53 on clutch 50 which is keyed to shaft 21 by the splines 121. The output worm gear 30 is driven by worm 33 on shaft 21. Gear 30 is keyed to the output drive sleeve 32. The output drive sleeve 32 contains a square hole which accepts the stem nut 35. The stem nut 35 is bored and keyed to fit and turn a particular valve stem.

Figure 5:
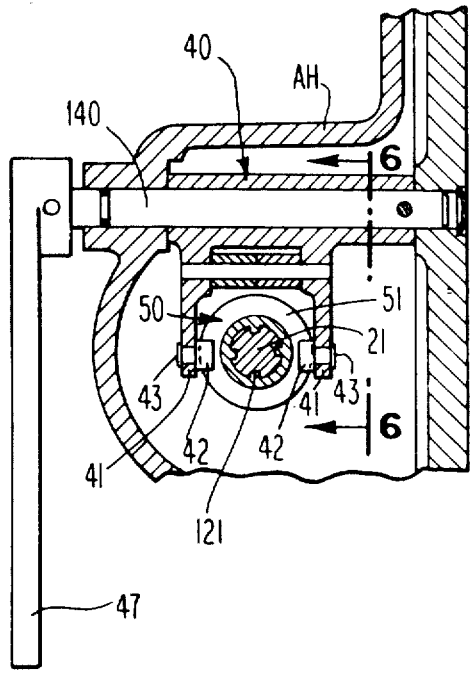
FIG. 5 is a view, in section, looking along the line 5—5 of FIG. 3 showing the clutch fork.

In manual operation, the handwheel 60 (FIG. 3) is connected when the de-clutch lever 47 (FIG. 5) is pulled manually into the handwheel mode. Pulling lever 47 pivots clutch fork 40 on shaft 140 and slides the clutch 50 leftwise on the splines of shaft 21, as viewed in FIG. 3. When this happens, the lugs 27 on sleeve 23 become disengaged from the lugs 53 on the clutch 50 and the other lugs 52 of the clutch engage the lugs 64 on the handwheel adapter 61. This places the mechanism in handwheel drive. The clutch 50 is held in this position by the L-shaped latch arms 72, 71, as will be described in detail later. Rotation of the handwheel 60 is transmitted through the clutch lugs and splines to the output worm shaft 21. The unit remains in the handwheel mode until the motor M is energized. When the motor M is energized, the worm gear sleeve 23 starts to rotate and a flat spot 26 (FIGS. 6A-6B) on sleeve step 25 comes into alignment, first with the longer latch arm and then with the shorter latch arm. This releases the clutch, in a two-step operation, as will be described, and allows fork 40 and clutch 50 to shift to the right under the force of compression spring 55, thereby putting the mechanism in motor drive.

Having described the new and improved de-clutch mechanism briefly, a more detailed description will now be given.

FIG. 1 illustrates the overall arrangement of the valve operator. Valve stem S is adapted to be driven by the valve operator mechanism. Drive motor M in housing CH is coupled to and drives the valve actuator mechanism in housing AH. Support plate P supports motor M and other component parts. The control housing CH the support plate P and the actuator housing AH are bolted together as by the bolts 10.

As seen in FIGS. 1, 3 and 4, mounted on output shaft 12 of motor M is a pinion 13 which is in mesh with and drives gear 15 mounted on worm shaft 16. Worm 17 is in mesh with and drives output worm gear 20. Output gear 20 is keyed by key 22 to drive sleeve 23. Input worm 20 and motor drive sleeve 23 are mounted for free rotation on shaft 21. The left end of shaft 21, as viewed in FIG. 3 is splined at 121, as seen in cross-section in FIG. 5. Mounted on splines 121 for rotation with shaft 21 is clutch member 50 having at one end lugs 52 and at the other end lugs 53. Clutch member 50 is adapted to be moved in a sliding manner back and forth on the splines 121 of the shaft 21 by pivotable fork 40.

Fork 40 is mounted for pivotal movement on shaft 140 by means of manually operable lever 47. Fork 40 has two legs 41 (FIG. 5) each of which carries a pin 43 on which is supported a roller 42. The rollers 42, spaced 180° apart, ride in a peripheral groove 51 in clutch 50. The rollers 42 bear against the walls of the clutch groove 51 so that when the fork 40 is pivoted manually by the lever 47, the clutch 50 is moved slidingly on the splines 121 of shaft 21. A heavy compression spring 55 biases clutch member 50 toward motor drive.

Mounted concentric with motor drive shaft 21 is handwheel 60 adapted for manual operation. Handwheel 60 is shown in FIG. 3 to be bolted to adapter 61 which has a recess 62 at its inner end which fits over the end of motor drive shaft 21. At the inner end of handwheel adapter 61 are lugs 64 which are adapted to engage with lugs 52 at the left end of clutch 50 when the clutch 50 is shifted to its leftmost position.

In accordance with the present invention, fork 40 is provided with an integral latch assembly identified generally in FIG. 3 by the reference numeral 70. Latch assembly 70 comprises two adjacent L-shaped latch lever arms 71 and 72 (FIG. 6 and 6A-6D) each of which is mounted on fork 40. The long leg of each of the latch arms 71, 72 extends from the fork 40 forwardly toward the motor drive sleeve 23 (FIG. 6) and the short leg of each latch arm extends downwardly and the undersurface of each short leg is inclined upwardly in the direction of the adjacent leg (FIGS. 6A-6C). Each of the latch arms 71, 72 is biased downwardly by a separate compression spring 75. The long leg of one of the latch arms 71 is slightly longer than the other latch arm 72, as shown in FIG. 6D.

Figure 6:
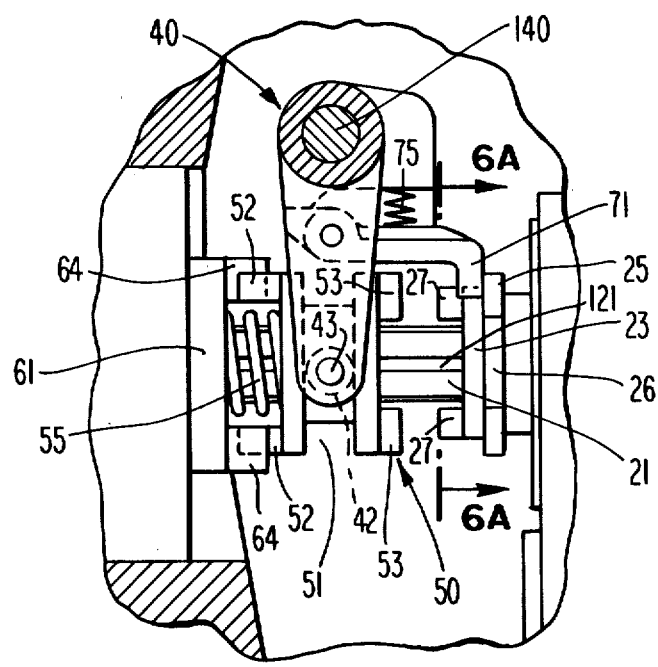
FIGS. 6 is a view looking along the line 6—6 of FIG. 5 showing the clutch and clutch fork.
Figure 6A:
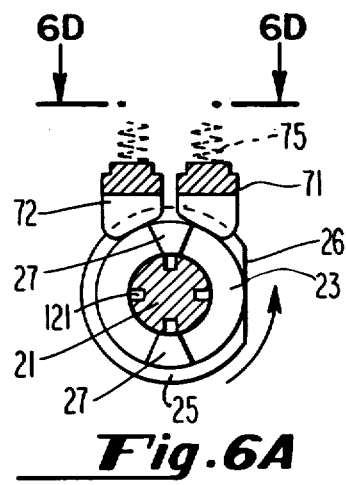
FIGS. 6A through 6D are a series of views looking along the line 6A—6A of FIG. 6 illustrating the operation of the latch levers.
Figure 6B:
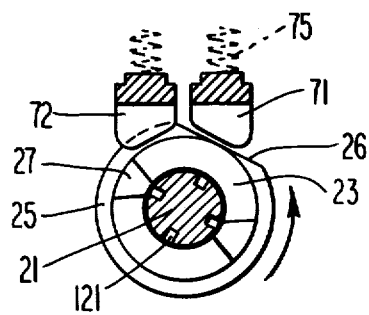
Figure 6D:
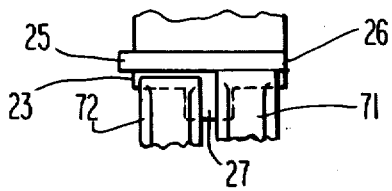
Figure 6C:
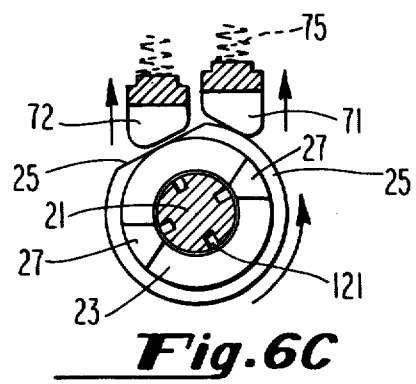

As seen best in FIG. 6 and in FIGS. 6A-6D, motor drive sleeve 23 is provided with an annular step 25 having a flat 26. Except when flat 26 is in alignment with one of the latch arms 71, 72, as illustrated in FIGS. 6B and 6C, the ends of the downwardly extending short legs of the latch arms are in abutting relation with the step 25, as illustrated in FIGS. 6 and 6A. Actually, only the longer latch arm 71 is in actual abutment. The shorter latch arm 72 is held just short of abutment by the longer latch arm. Abutment of the longer latch arm 71 against the step 25 prevents the heavy compression spring 55 from shifting the clutch fork 40 pivotally counter-clockwise, as viewed in FIG. 6 and prevents shifting clutch 50 out of handwheel drive into motor drive.

When the electric motor drive is turned ON, worm 17 (FIG. 3) drives the input worm gear 20 and, since sleeve 23 is keyed by key 22 to gear 20, sleeve 23 is driven rotationally. The preferred direction of rotation of sleeve 23 is indicated by the arrow in FIG. 6A and is such that the longer latch arm 71 first comes into alignment with flat 26 on step 25, as is illustrated in FIG. 6B. Latch arm 71 is now unobstructed and can move forwardly and fork 40 can pivot counterclockwise but both can move for only a very small distance since movement is limited by the second latch arm 72 which has now abutted against sleeve step 25. As rotation of sleeve 23 continues, in the direction of the arrow in FIG. 6B, flat 26 comes into full alignment with the second latch arm 72, as illustrated in FIG. 6C, and the second latch arm 72 is now free to move forwardly, i.e., to the right as viewed in FIGS. 3 and 6. However, by the time the second latch arm 72 has come into full alignment with flat 26 and is no longer obstructed by step 25, the first latch arm 71 has been cammed up the now inclined slope of the flat 26 and has come to rest on the top edge of the step 25, as illustrated in FIG. 6C. Thus, both latch arms 71,72 are now free. The fork 40 is no longer latched and is now free to move pivotally in the counter-clockwise direction and does so in response to the force of the heavy compression spring 55 against the opposing action of the lighter compression springs 75, one of which is attached to each of the latch arms 71,72. In this manner, clutch 50 is shifted out of handwheel engagement into electric motor engagement. This is the condition illustrated in FIG. 3.

In FIG. 3, lugs 52 of clutch 50 are no longer in engagement with the lugs 64 of the handwheel drive. Instead, lugs 53 at the right end of clutch 50 are now in lug-on-lug engagement with lugs 27 at the left end of the worm gear sleeve 23. And, since worm gear sleeve 23 is being driven rotationally by motor drive input worm gear 20, the clutch 50 is driven rotationally by sleeve 23. Since clutch 50 is splined to shaft 21, shaft 21 is now driven rotationally. This drives worm 33 which, being in mesh with output worm gear 30, drives worm gear 30 rotationally. Worm gear 30 is keyed, as by key 31, to output drive sleeve 32 and thus output drive sleeve 32 is driven rotationally. This drives stem nut 35 (FIG. 1) rotationally and causes stem S to turn clockwise or counterclockwise according to the direction in which the motor was energized.

Where the valve operator is a part-turn operator, the amount of rotation of stem nut 35 and valve stem S is limited by the primary positioning limit switches 130 (FIG. 1). These switches are operated by the cams 131 which are adjustable on cam shaft 132. Cam shaft 132 is fixed to and rotates with output drive sleeve 32. While the primary position limiting elements are limit switches 130, mechanical stops 91 are also provided to assure that stem S does not rotate beyond the point desired. This assurance is provided by the stop lug 90 (FIG. 1) which is secured to or made an integral part of stem nut 35. When and if stop lug 90 reaches one of the stop screws 91, rotation of stem nut 35 is halted.

When rotation of stem nut 35 is stopped, rotation of worm gear 30 is also stopped. However, the motor drive gear 20 is still being driven by the drive worm 17 and worm 33 on output shaft 21 is still being driven rotationally. The fact that gear 30 is prevented from rotating, while worm 33 is still being driven, causes worm 33 to try to climb up the threads of gear 30. This causes shaft 21 to move to the right, as viewed in FIG. 3, against the action of the disk spring 81. Movement of shaft 21 to the right moves rack 82 to the right and causes rotation of shaft 94. As seen in FIG. 7, rotation of splined shaft 94, rotates switch arms 96 and actuates microswitch 95. This shuts off power to the motor M.

As has already been described, when the valve operator is in handwheel drive, lugs 64 are in engagement with lugs 52, and manual rotation of the handwheel drives clutch 50 rotationally. Since clutch 50 is splined to output shaft 21, output shaft 21 is moved rotationally. Since the motor drive sleeve 23 is mounted on output shaft 21, there is the possibility that there will be sufficient frictional engagement between the manually actuated shaft 21 and the motor drive sleeve 23 to cause sleeve 23 to move rotationally. If this should occur, there is a possibility that the flat 26 of step 25 will come into alignment with the latch arms 71,72. This would release the latch and permit the heavy compression spring 55 to pivot the fork 40 counterclockwise, thereby shifting the clutch 50 out of handwheel drive.

As previously stated, this occurrence is undesirable and would inhibit handwheel operation of the unit.

To avoid the possibility described above, the worm and worm gear drive are made self-locking. That is, the pitch angle of the threads of the worm 17 is made sufficiently steep that it is impossible for worm gear 20 to move rotationally unless the worm 17 is being driven. Since sleeve 23 is keyed to worm gear 20, sleeve 23 cannot rotate even though there is frictional engagement between sleeve 23 and the manually actuated shaft 21.

What is claimed is:
1. A valve operator comprising:
   a. an output shaft having a splined portion;
   b. a clutch mounted for sliding movement on said splined portion of said output shaft, said clutch having lugs projecting from its opposite ends;
   c. a handwheel drive member coaxial with said clutch and located to one side thereof, said handwheel drive member having lugs adapted for engagement with the lugs at one end of said clutch;
   d. a motor drive sleeve mounted for free rotation on said output shaft, said sleeve having lugs adapted for engagement with the lugs at the other end of said clutch;
   e. an annular step on said sleeve;
   f. a flat on said annular step;
   g. spring means biasing said clutch toward the motor drive sleeve;
   h. a pivotal fork connected to and movable with said clutch for shifting said clutch on said splined portion of said output shaft;
   i. a pair of latch arms extending from said fork in the direction of said motor drive sleeve, one of said latch arms being slightly longer than the other, the end of said longer latch arm being adapted to abut against said annular step on said sleeve, said longer latch arm being adapted to move into said flat when said flat and longer latch arm are in alignment, thereby to allow said spring-biasing means to move said clutch and fork toward but short of said motor drive sleeve, said movement being limited by the abutment of said shorter latch arm against said sleeve step, whereby upon further rotation of said motor drive sleeve, said flat comes into alignment with said shorter latch arm, allowing said shorter latch arm to move into said flat, thereby allowing said spring-biasing means to shift said clutch fully so that said clutch lugs come into engagement with the lugs on said motor drive sleeve, and
   j. a self-locking input worm set for driving said motor drive sleeve.

2. A valve operator according to claim 1 wherein each of said pair of latch arms is L-shaped, having a long leg and a downwardly extending short leg at the outer end of said long leg.

3. A valve operator according to claim 2 wherein the under surface of each of said downwardly extending short legs is inclined upwardly in the direction of the adjacent leg.

4. In a valve operator;
   a. a shiftable clutch;
   b. a pivotal fork connected to said clutch for shifting said clutch;
   c. spring means biasing said clutch in one direction;
   d. an annular step member;

e. first and second latch arms connected to and extending from said fork toward said step member;
f. said first latch arm being longer than said second latch arm and abutting against said annular step member, said second latch member being short of abutment;
g. a flat on said annular step member;
h. means for rotating said annular step member whereby said plat comes into alignment with said longer latch arm and allows said first latch arm to move into said flat, said movement being limited by the ensuing abutment of said shorter latch arm against said step member whereby upon further rotation of said annular step member said shorter latch arm comes into alignment with said flat and moves into said flat thereby to allow full pivotal movement of said fork, thereby to complete the shifting of said clutch in the biased direction.

5. Apparatus according to claim 4 wherein each of said latch arms is L-shaped having a long leg and a shorter leg depending from the end of said long leg.

6. Apparatus according to claim 5 wherein the under surface of each of said short depending legs is inclined upwardly in the direction of the adjacent leg.

7. Apparatus according to claim 4 where said means for rotating said annular step member includes a self-locking input worm set comprising a drive worm and a worm gear, said worm gear being connected to said annular step member, the pitch angle of the threads of said worm being sufficiently steep to prevent said worm gear from moving rotationally unless said worm is being driven.

* * * * *